United States Patent [19]
Klatte

[11] Patent Number: 5,853,689
[45] Date of Patent: Dec. 29, 1998

[54] METHOD FOR PRODUCING CHLORINE DIOXIDE BY ACTIVATING AN IMPREGNATED ZEOLITE CRYSTAL MIXTURE, AND MIXTURES FOR PERFORMING SUCH METHOD

[76] Inventor: Fred Klatte, Two Spruce St., San Francisco, Calif. 94118

[21] Appl. No.: 89,611

[22] Filed: Jun. 3, 1998

Related U.S. Application Data

[63] Continuation-in-part of Ser. No. 798,873, Feb. 11, 1997.
[51] Int. Cl.$^6$ ................................................. C01B 11/02
[52] U.S. Cl. .............................. 423/478; 423/477; 502/60
[58] Field of Search .................................. 423/477, 478; 502/60, 64

[56] References Cited

U.S. PATENT DOCUMENTS

| | | | |
|---|---|---|---|
| 3,271,242 | 9/1966 | McNicholas | 167/17 |
| 4,247,531 | 1/1981 | Hicks | 423/477 |
| 4,547,381 | 10/1985 | Mason et al. | 426/316 |
| 4,590,057 | 5/1986 | Hicks | 423/477 |
| 4,689,169 | 8/1987 | Mason et al. | 252/186.24 |
| 4,731,193 | 3/1988 | Mason et al. | 252/95 |
| 4,889,654 | 12/1989 | Mason et al. | 252/100 |
| 5,278,112 | 1/1994 | Klatte | 502/62 |
| 5,567,405 | 10/1996 | Klatte et al. | 423/477 |
| 5,573,743 | 11/1996 | Klatte et al. | 423/477 |

FOREIGN PATENT DOCUMENTS 6-285368  10/1994  Japan .

OTHER PUBLICATIONS

Masschelein, Chlorine Dioxide–Chemistry and Environmental Impact of Oxychlorine Compounds (1979) (Ann Arbor Science Publishers Inc., Ann Arbor, Michigan), pp. 138–141.

Primary Examiner—Steven Bos
Assistant Examiner—Thomas G. Dunn, Jr.
Attorney, Agent, or Firm—Limbach & Limbach L. L. P.

[57] ABSTRACT

A method for producing chlorine dioxide by activating a mixture of impregnated zeolite crystals, the mixture itself, and a method for regenerating the mixture after chlorine dioxide production. The activation is accomplished by causing water or a moisture-containing gas (e.g., air including water vapor) to flow through the mixture or otherwise exposing the mixture to such fluid, or by exposing the mixture to liquid hydrogen peroxide, liquid sulfuric acid, ferric chloride solution, or sodium chlorate solution. The mixture can include sodium chlorite-impregnated zeolite crystals and zeolite crystals impregnated with ferric chloride, ferric sulfate, or both, and optionally also zeolite crystals impregnated with calcium chloride. Alternatively, the mixture includes sodium chlorate-impregnated zeolite crystals, sulfuric acid-impregnated zeolite crystals, zeolite crystals impregnated with one or more of calcium chloride (or another deliquescent or water absorbing and retaining substance, such as one or more of ferric chloride and ferric sulfate), and an oxidizer (such as hydrogen peroxide, sodium metabisulfite, or sodium bisulfite). The oxidizer reacts (in the presence of water absorbed by the deliquescent or water absorbing substance) to release another substance which in turn reacts with one or more of the other impregnating substances to produce chlorine dioxide. The chlorine dioxide release rate can be controlled in any of several ways, including by selecting the concentration and amount of activating liquid, or using zeolite having a selected weight ratio of one or more impregnating substance to zeolite.

63 Claims, 2 Drawing Sheets

METHOD FOR PRODUCING CHLORINE DIOXIDE BY ACTIVATING AN IMPREGNATED ZEOLITE CRYSTAL MIXTURE, AND MIXTURES FOR PERFORMING SUCH METHOD

CROSS-REFERENCE TO RELATED APPLICATION

The present application is a continuation-in-part of U.S. patent application Ser. No. 08/798,873, filed Feb. 11, 1997.

FIELD OF THE INVENTION

The invention relates to methods for producing chlorine dioxide, to zeolite crystal mixtures used in performing such methods, and to methods for regenerating the mixtures after chlorine dioxide production. Each method produces chlorine dioxide by activating a mixture of chemical-impregnated zeolite crystals.

BACKGROUND OF THE INVENTION

Zeolites are hydrated metal aluminosilicate compounds with well-defined (tetrahedral) crystalline structures. Because zeolite crystals (both natural and synthetic) have a porous structure with connected channels extending through them, they have been employed as molecular sieves for selectively absorbing molecules on the basis of size, shape, and polarity.

Zeolite crystals have also been impregnated (throughout their volume) with a variety of chemicals, and optionally also have been coated (i.e., the pores near their outer surface have been impregnated) with other chemicals. For example, U.S. Pat. No. 5,314,852 (issued May 24, 1994) teaches impregnating zeolite crystals with a variety of substances including metal salts (such as $Fe_2SO_4$ or $FeCl_3$). The impregnated crystals are then optionally coated with a quaternary ammonium cation, to achieve regulated time release control of the impregnating substance (i.e., to permit a controlled release rate of the impregnating substance) for applications such as air filtration, animal feed, etc.

Volumes packed with zeolite crystals (for example, small zeolite crystals chosen to have size in the range from 0.2 mm to one quarter inch) have been employed in air (or other gas) and water filtration systems to selectively absorb contaminants from a flowing stream of water or gas.

U.S. Pat. No. 5,567,405, issued Oct. 22, 1996, and U.S. Pat. No. 5,573,743, issued Nov. 12, 1996, teach methods for producing zeolite crystals impregnated with one or more of sodium chlorite, acetic acid, phosphoric acid, and citric acid, and methods for producing chlorine dioxide by moving a fluid (e.g., air or water) relative to a bed of zeolite crystals impregnated with sodium chlorite, and moving the fluid relative to another bed of zeolite crystals impregnated with one of the following: phosphoric acid, acetic acid and citric acid. The two beds can be physically mixed together, or the fluid can flow sequentially through distinct first and second beds. These references also teach a method for filtering a fluid by producing chlorine dioxide in the fluid (in the manner described in this paragraph) and then absorbing the chlorine dioxide from the fluid.

U.S. Pat. No. 5,730,948, issued Mar. 24, 1998, teaches a variation on the chlorine dioxide production method of U.S. Pat. No. 5,567,405, which includes the steps of moving a fluid through a first bed of impregnated zeolite crystals (impregnated with at least one of phosphoric acid, acetic acid, and citric acid) and then moving the fluid through a second bed of impregnated zeolite crystals (impregnated with sodium chlorite).

Chlorine dioxide ($ClO_2$) is useful for killing biological contaminants (such as microorganisms, mold, fungi, yeast and bacteria) and for oxidizing volatile organic chemicals which can contaminate fluid.

It is known to produce chlorine dioxide by: activating a metal chlorite solution by adding an acid thereto; activating a powdered composition (or other dry composition) by adding water thereto; or preparing an activated dry composition which releases chlorine dioxide over time. U.S. Pat. No. 4,547,381 (issued Oct. 15, 1985) and U.S. Pat. No. 4,689,169 (issued Aug. 25, 1987) mention these three techniques for producing chlorine dioxide, and disclose in some detail one type of such an activated dry composition. They teach that this activated dry composition is a mixture of a "dry inert diluent," a metal chlorite, and a dry agent capable of reacting with the metal chlorite in a dry state to produce chlorine dioxide. The metal chlorite can be sodium chlorite, and the dry agent can be a "dry acid" such as granular citric acid. The inert diluent can be diatomaceous earth, sodium chloride, sodium silicate, disodium sulfate, or magnesium chloride, or a combination of two or more thereof. The mixture releases chlorine dioxide over time until the rate of chlorine dioxide release becomes low, and the patents teach that the mixture can then be agitated for "renewed generation" of chlorine dioxide.

However, an activated composition (such as that described in U.S. Pat. Nos. 4,547,381 and 4,689,169) is subject to undesirable storage and shipping losses, due to outgassing of chlorine dioxide before the time of intended use of the composition.

Similarly, the inventor has found that sodium chlorite-impregnated zeolite crystals (of the type described in referenced U.S. Pat. Nos. 5,567,405 and 5,573,743) are also subject to undesirable storage and shipping losses, due to outgassing of chlorine dioxide therefrom before the time of their intended use (e.g., before fluid is caused to flow through both a bed of the sodium chlorite-impregnated zeolite crystals and a bed of acid-impregnated zeolite crystals). Also, efforts to activate sodium chlorite-impregnated zeolite crystals (of the type described in referenced U.S. Pat. Nos. 5,567,405 and 5,573,743) with acid at low temperature (below 40 degrees Fahrenheit) may fail in the sense that they will not result in release of sufficient amounts of chlorine dioxide.

There are also disadvantages to use of conventional metal chlorite solutions (of the type mentioned in U.S. Pat. Nos. 4,547,381 and 4,689,169) to produce chlorine dioxide. For example, when such a conventional solution is activated (by adding an acid thereto) to release chlorine dioxide gas, it is difficult or impossible to control the rate of release of the chlorine dioxide gas. Overproduction of chlorine dioxide often results.

There are also disadvantages to use of conventional powdered or dry compositions of the type activated by adding water thereto to release chlorine dioxide (as mentioned, for example, in U.S. Pat. Nos. 4,547,381 and 4,689,169). Masschelein, in the book *Chlorine Dioxide—Chemistry and Environmental Impact of Oxychlorine Compounds* (published 1979 by Ann Arbor Science Publishers Inc., Ann Arbor, Mich.) at page 140, describes one such dry mixture comprising sodium chlorite, and a solid organic anhydride containing 2 to 20% of a desiccating product such as calcium chloride. When such a conventional dry composition is activated (by adding water thereto) to release chlorine dioxide gas, it is typically difficult or impossible to control the rate of release of the chlorine dioxide to achieve chlorine dioxide release rates useful for such applications as air or water filtration. Overproduction of chlorine dioxide often results.

Above-referenced U.S. patent application Ser. No. 08/798,873 discloses a stable, unactivated, dry, chemical-impregnated zeolite material which does not release significant amounts of chlorine dioxide until activated by exposure to an acid, and which releases chlorine dioxide at a useful and controllable rate when exposed to an acid (even at temperatures below 40 degrees Fahrenheit). The zeolite material comprises zeolite crystals which have been impregnated with a metal chlorite (such as sodium chlorite) and a water-retaining substance (such as magnesium sulfate, potassium chloride, potassium hydroxide, or calcium chloride). U.S. patent application Ser. No. 08/798,873 also discloses use of the zeolite material to release chlorine dioxide in a controlled manner for filtering air or water.

Throughout this disclosure, zeolite crystals are said to be "impregnated" with a chemical when pores throughout the volume of each crystal contain the chemical. In contrast, zeolite crystals are said to be "coated" with a chemical when only pores near the outer surface of each crystal contain the chemical; not pores deep within the crystal's interior.

SUMMARY OF THE INVENTION

In a class of embodiments, the invention is a method for producing chlorine dioxide by activating a mixture of zeolite crystals previously impregnated with ferric chloride (or alternatively ferric sulfate, or both ferric chloride and ferric sulfate), and zeolite crystals previously impregnated with sodium chlorite. Preferably, each chlorite-impregnated crystal comprises sodium chlorite in an amount in the range 2%–10% by weight and each iron-salt impregnated crystal comprises iron salt in an amount in the range 2%–15% by weight. The activation can be accomplished by exposing the mixture to a moisture-containing gas (e.g., air including water vapor), or (to increase the chlorine dioxide production rate) by causing water or a moisture-containing gas to flow through the mixture (or causing the mixture to move through such fluid). When activation is accomplished using flowing fluid, all impregnated zeolite crystals can be physically mixed together in a single bed or the gas can be caused to flow sequentially through distinct beds of subsets of the zeolite crystals. Since each iron salt (ferric chloride or ferric sulfate) has low pH in the presence of water, when the iron salt-impregnated zeolite crystals (in the presence of sodium chlorite-impregnated zeolite crystals) absorb moisture the resulting acid activates the sodium chlorite-impregnated zeolite, causing production of chlorine dioxide. Optionally, the mixture also includes zeolite crystals impregnated with calcium chloride. When the mixture includes crystals impregnated with calcium chloride, the calcium chloride (as well as the iron salt) absorbs moisture (e.g., ambient water vapor), thus increasing the chlorine dioxide production rate.

In other embodiments, the invention is a method for producing chlorine dioxide by activating a mixture comprising zeolite crystals impregnated with sulfuric acid, zeolite crystals impregnated with sodium chlorate, zeolite crystals impregnated with calcium chloride, and zeolite crystals impregnated with one or more of ferric chloride or ferric sulfate. Preferably, ferric chloride is used (rather than ferric sulfate or a mixture of ferric chloride and ferric sulfate). Preferably, each iron-salt impregnated crystal comprises iron salt in an amount in the range 2%–15% by weight, and each other impregnated crystal comprises 2%–10% (by weight) of the impregnating substance. The activation can be accomplished by exposing the mixture to a moisture-containing gas (e.g., air including water vapor), or causing water or a moisture-containing gas to flow through the mixture (or by causing the mixture to move through the gas). When activation is accomplished using flowing fluid, all impregnated zeolite crystals can be physically mixed together in a single bed, or the gas can be caused to flow sequentially through distinct beds of subsets of the zeolite crystals.

In other embodiments, the invention is a method for producing chlorine dioxide by activating a zeolite crystal mixture comprising zeolite crystals impregnated with sulfuric acid, zeolite crystals impregnated with sodium chlorate, zeolite crystals impregnated with at least one of hydrogen peroxide ($H_2O_2$), ferric chloride, and peracetic acid, and zeolite crystals impregnated with calcium chloride. Preferably, the mixture comprises equal (or substantially equal) amounts of crystals impregnated with each of the four chemicals, and each impregnated crystal comprises 2%–10% (by weight) of the impregnating substance. The activation can be accomplished by exposing the mixture to a moisture-containing gas (e.g., air including water vapor), or causing water or a moisture-containing gas to flow through the mixture (or by causing the mixture to move through the gas). When activation is accomplished using flowing fluid, all impregnated zeolite crystals can be physically mixed together in a single bed, or the gas can be caused to flow sequentially through distinct beds of subsets of the zeolite crystals.

In variations on the embodiments of the previous paragraph, zeolite crystals impregnated with sodium metabisulfite (or sodium bisulfite) are used rather than zeolite crystals impregnated with one or more of hydrogen peroxide, ferric chloride, and peracetic acid. Activation by absorbed water causes a reaction of the sodium metabisulfite (or sodium bisulfite) which releases $SO_2$. The $SO_2$ then reacts to form chlorine dioxide gas.

In other embodiments, the invention is a method for producing chlorine dioxide by activating a zeolite crystal mixture, where the zeolite crystal mixture comprises zeolite crystals impregnated with sodium chlorate, zeolite crystals impregnated with sulfuric acid, zeolite crystals impregnated with a deliquescent (or water absorbing and retaining substance) other than calcium chloride or any of the above-mentioned iron salts, and zeolite crystals impregnated with an oxidizer. Preferably, each iron-salt impregnated crystal comprises iron salt in an amount in the range 2%–15% by weight, and each other impregnated crystal comprises 2%–10% (by weight) of the impregnating substance. The activation can be accomplished by exposing the mixture to a moisture-containing gas (e.g., air including water vapor), or causing water or a moisture-containing gas to flow through the mixture (or by causing the mixture to move through the gas). When activation is accomplished using flowing fluid, all impregnated zeolite crystals can be physically mixed together in a single bed, or the gas can be caused to flow sequentially through distinct beds of subsets of the zeolite crystals comprising the mixture. The deliquescent (or water absorbing and retaining substance) can be magnesium sulfate ($MgSO_4$), potassium chloride, or magnesium chloride (MgCl). The oxidizer is a substance (or mixture of substances) which reacts (in the presence of water absorbed by the deliquescent or water absorbing substance) to release another substance which in turn reacts with one or more of the other impregnating substances to produce chlorine dioxide.

In the above-mentioned embodiments, the mixture is preferably stored in a dry, air-tight container prior to activation. The container is unsealed to expose the mixture to the activating fluid shortly before activation.

In alternative embodiments, the invention is a method for producing chlorine dioxide by activating an impregnated zeolite crystal mixture with ferric chloride solution (or alternatively, liquid hydrogen peroxide or liquid peracetic acid). The zeolite mixture comprises zeolite crystals impregnated with sodium chlorate, zeolite crystals impregnated with sulfuric acid, and zeolite crystals impregnated with calcium chloride.

In other embodiments, the invention is a method for producing chlorine dioxide by activating an impregnated zeolite crystal mixture with liquid sulfuric acid. The zeolite mixture comprises zeolite crystals impregnated with sodium chlorate, zeolite crystals impregnated with at least one of hydrogen peroxide ($H_2O_2$), ferric chloride, and peracetic acid, and zeolite crystals impregnated with calcium chloride.

In other embodiments, the invention is a method for producing chlorine dioxide by activating an impregnated zeolite crystal mixture with sodium chlorate solution. The zeolite mixture comprises zeolite crystals impregnated with sulfuric acid, zeolite crystals impregnated with at least one of hydrogen peroxide, ferric chloride, and peracetic acid, and zeolite crystals impregnated with calcium chloride.

In any of the latter three embodiments, each impregnated crystal comprises 2%–10% (by weight) of the impregnating substance.

Also within the scope of the invention are methods in which mixtures of the above-described impregnated zeolite mixtures are activated to produce chlorine dioxide. An example is a method for producing chlorine dioxide by activating a zeolite crystal mixture comprising zeolite crystals impregnated with sulfuric acid, zeolite crystals impregnated with sodium chlorate, zeolite crystals impregnated with at least one of hydrogen peroxide, ferric chloride, and peracetic acid, zeolite crystals impregnated with calcium chloride, and zeolite crystals impregnated with sodium metabisulfite (or sodium bisulfite).

In any embodiment of the invention, the rate of chlorine dioxide release (following activation) can be controlled in any of several ways, including by appropriately selecting the concentration and amount of the activating fluid, or using impregnated zeolite crystals having an appropriately selected weight ratio of one or more of the impregnating substances (e.g., iron salt) to zeolite. For example, in embodiments employing zeolite crystals impregnated with ferric chloride, the rate of chlorine dioxide production will be lower if the crystals contain a lower concentration of ferric chloride (by weight).

In another class of embodiments, the inventive method includes the step of regenerating the impregnated zeolite crystal mixture used in performing any embodiment of the inventive chlorine dioxide production method. Preferably, the regeneration is accomplished as follows (assuming that the mixture is initially produced with the crystals impregnated with each chemical having a distinctive size range or size): after chlorine dioxide production, the spent crystals are sorted by size and cleaned if necessary; the spent crystals in each distinctive size range are then reimpregnated with the appropriate chemical; and the reimpregnated crystals are mixed together in the appropriate ratio(s).

When impregnating (or reimpregnating) zeolite crystals with ferric chloride (or ferric sulfate), the ferric chloride (or sulfate) is melted in an oven, and then mixed with zeolite crystals. Before the mixing step, the crystals have preferably had their moisture content reduced substantially (below an initial moisture content) to a low level (e.g., about 5%).

Another aspect of the invention is a mixture of impregnated zeolite crystals which can be activated (in accordance with the invention) to perform any embodiment of the inventive method for producing chlorine dioxide.

DETAILED DESCRIPTION OF THE PREFERRED EMBODIMENTS

Figure 1:
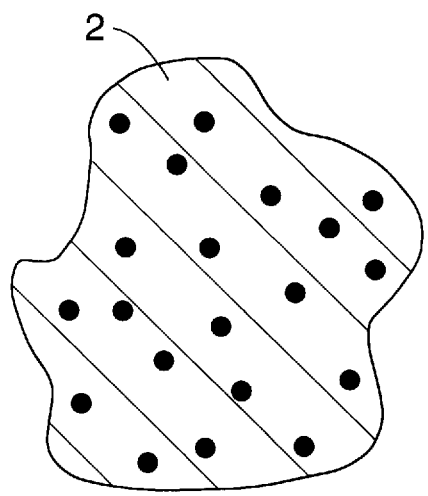
FIG. 1 is a cross-sectional view of a zeolite crystal impregnated with sodium chlorite, or one or more of ferric chloride, ferric sulfate, and calcium chloride.

In one class of embodiments, the invention is a mixture of chemical-impregnated zeolite crystals, each crystal impregnated with one of the substances described herein. Examples of such substances are sodium chlorite, ferric chloride, ferric sulfate, calcium chloride (or another deliquescent or water absorbing and retaining substance), sodium chlorate, sulfuric acid, hydrogen peroxide, peracetic acid, sodium metabisulfite, or sodium bisulfite (or an oxidizer other than hydrogen peroxide, peracetic acid, sodium metabisulfite, sodium bisulfite, and ferric chloride). The zeolite crystals can have size (i.e., largest dimension) equal (or approximately equal) to 0.125 inch, 0.25 inch, 0.50 inch, or 0.75 inch, or size in the range from 0.2 mm to several millimeters, or size in the range from 0.2 mm to 0.25 inch, or the zeolite crystals can have dimensions equal or substantially equal to 0.25 inch×0.167 inch, 0.125 inch×0.10 inch, 0.25 inch×0.125 inch, 0.125 inch×0.50 inch, or 0.50 inch×0.75 inch. The impregnation process preferably produces zeolite crystals uniformly impregnated (throughout the volume of each crystal) with the impregnating substance.

Preferably, the impregnation process employs, as input material, zeolite crystals whose moisture content has been reduced (substantially below an initial moisture content) to a low level (preferably about 5%). Such input material is preferably produced by mining zeolite, crushing the mined mineral into appropriately sized zeolite crystals (having a natural moisture content substantially above 5%), and then dehydrating the zeolite crystals until their moisture content is reduced to about 5%.

The dehydrated zeolite crystals are then immersed in (or sprayed with) an aqueous solution of the impregnating chemical (or with the impregnating chemical in molten form), and the resulting slurry is thoroughly mixed to produce impregnated zeolite crystals. The mixed slurry is then air dried (or allowed to equilibrate to a desired reduced moisture level) if necessary to produce impregnated zeolite crystals having the desired moisture level. The air drying step can be avoided by calculating an amount of aqueous impregnating material needed to achieve the desired final moisture level (e.g., 15%, or a desired level in the range 15%–20%) and adding only this amount to the dehydrated zeolite at the time of impregnation.

Where the dehydrated zeolite crystals are immersed in (or sprayed with) an aqueous solution of the impregnating chemical, each impregnated crystal can (and preferably does) comprise 2%–10% (by weight) of the impregnating substance at the end of the impregnating process. Where the dehydrated zeolite crystals are immersed in (or sprayed with) a molten impregnating chemical, each impregnated crystal can (and preferably does) comprise 2%–15% (by weight) of the impregnating substance at the end of the impregnating process.

For example, to impregnate zeolite crystals with sodium chlorite or calcium chloride, dehydrated zeolite crystals are immersed in (or sprayed with) an aqueous solution of sodium chlorite or calcium chloride at high temperature (e.g., at least 190° F.), and the resulting slurry is thoroughly mixed. Then, the mixed slurry is air dried (or allowed to equilibrate to the desired moisture level) to produce impregnated zeolite crystals comprising Y % sodium chlorite (or calcium chloride by weight, where Y is in the range from 2 to 10.

As another example, a preferred method for impregnating zeolite crystals with ferric chloride (or ferric sulfate) for use in performing the inventive method is as follows. Dehydrated zeolite crystals are provided, having moisture content that has been reduced substantially (below an initial moisture content) to a low level (e.g., about 5%). Ferric chloride (and/or ferric sulfate) is heated to its melting point in an oven, the dehydrated zeolite crystals are immersed in (or sprayed with) the molten ferric chloride (and/or sulfate), and the resulting slurry is thoroughly mixed. The mixed slurry is allowed to cool to room temperature to produce impregnated zeolite crystals comprising X % ferric chloride (and/or ferric sulfate) by weight, where X is in the range from 2 to 15. Where the dehydrated zeolite crystals are immersed in (or sprayed with) molten ferric chloride (and/or ferric sulfate), each resulting iron-salt impregnated crystal can (and preferably does) comprise 2%–15% (by weight) of the impregnating iron salt(s) at the end of the impregnating process.

Figure 2:
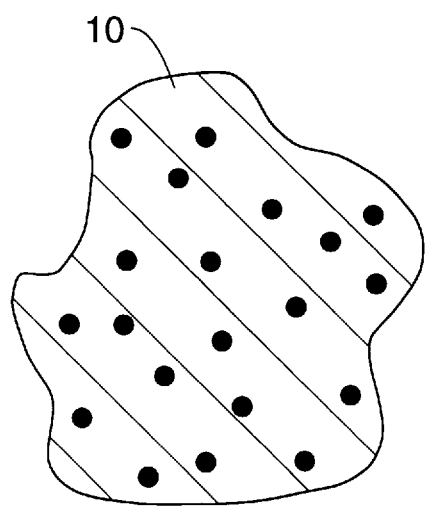
FIG. 2 is a cross-sectional view of a zeolite crystal impregnated with one of the following impregnating agents: sodium chlorate, sulfuric acid, a deliquescent (or water absorbing and retaining substance), and an oxidizer.

FIG. 1 represents one impregnated zeolite crystal, having channels uniformly impregnated with substance 2, which is sodium chlorite, or one or more of ferric chloride, ferric sulfate, and calcium chloride. A mixture of crystals of the type shown in FIG. 1 can be used to perform any of a first class of embodiments (described below) of the inventive method. FIG. 2 represents a zeolite crystal uniformly impregnated with substance 10, which is one of the following impregnating agents: sodium chlorate, sulfuric acid, a deliquescent (or water absorbing and retaining substance), and an oxidizer. A mixture of crystals of the type shown in FIG. 2 can be used to perform any of a second class of embodiments (described below) of the inventive method. In performing the second class of embodiments, the water-retaining substance is preferably calcium chloride. Alternatively, magnesium sulfate ($MgSO_4$), potassium chloride, magnesium chloride (MgCl), or another deliquescent (or water absorbing and retaining substance) can be substituted for calcium chloride.

In a first class of embodiments, the invention is a method for producing chlorine dioxide by activating a mixture of zeolite crystals previously impregnated with sodium chlorite and zeolite crystals previously impregnated with one or more of ferric chloride ($FeCl_3$) or ferric sulfate ($Fe_2(SO_4)_3$). The activation can be accomplished by exposing the mixture to a moisture-containing gas (e.g., air including water vapor), or (to increase the chlorine dioxide production rate) by causing water or a moisture-containing gas to flow through the mixture (or causing the mixture to move through such fluid). When activation is accomplished using flowing fluid, the impregnated zeolite crystals can be physically mixed together in a single bed or the fluid can be caused to flow sequentially through distinct beds of subsets of the zeolite crystals (i.e., one bed of sodium chlorite-impregnated zeolite crystals and another bed of iron salt-impregnated zeolite crystals). Preferably, crystals impregnated with ferric chloride are used (rather than crystals impregnated with ferric sulfate, or a mixture of ferric chloride and ferric sulfate).

Since each of ferric chloride and ferric sulfate becomes acidic in the presence of water (i.e., each iron salt has low pH in the presence of water), when the iron salt-impregnated zeolite crystals (in the presence of sodium chlorite-impregnated zeolite crystals) absorb moisture from air the resulting acid activates the sodium chlorite-impregnated zeolite, causing production of chlorine dioxide. Upon activation of an embodiment of the mixture which includes ferric chloride-impregnated zeolite, it is believed that the ferric chloride reacts so as to produce ferric hydroxide as well as chlorine dioxide. The reaction is believed to be as follows: $3\ Na(ClO_2)+Fe(Cl_3)+3H_2O \rightarrow 3H^+ClO_2\uparrow +Fe(OH)_3+3NaCl$. The ferric hydroxide has catalytic properties, and thus is believed to exhibit continuing activity over a period of time (following initial production of the chlorine dioxide and ferric hydroxide) in the sense that it contributes to continuous chlorine dioxide production over this period after initial activation of the impregnated mixture.

Optionally, the mixture also includes zeolite crystals impregnated with calcium chloride. When the mixture includes crystals impregnated with calcium chloride, the calcium chloride in some crystals of the mixture (as well as the iron salt in other crystals of the mixture) absorbs water (e.g., ambient water vapor), thus increasing the rate of chlorine dioxide production (above the rate achievable if the mixture did not include calcium chloride-impregnated crystals).

The rate of chlorine dioxide release can be regulated (reduced or increased to a desired level) by changing the ratio of iron salt to zeolite (by weight) in the iron salt-impregnated zeolite crystals of the mixture, and/or by adding a greater proportion of calcium chloride-impregnated crystals to the mixture. Also, the method of activating the mixture affects the chlorine dioxide release rate. For example, activation by exposing the mixture to non-flowing moisture-containing gas typically results in a low chlorine dioxide release rate, and activation by flowing a quantity of water or moisture-containing gas through the mixture typically results in a higher chlorine dioxide release rate. Prior to activation, the iron salt-impregnated crystals, the sodium chlorite-impregnated crystals, and any calcium chloride-impregnated crystals of the mixture should be as dry as possible (preferably, the mixture is sealed within a dry, air-tight capsule or other container, and the container is unsealed to expose the mixture to the activating fluid shortly before activation).

In a second class of embodiments, the invention is a method for producing chlorine dioxide by activating a mixture comprising zeolite crystals impregnated with sulfuric acid, zeolite crystals impregnated with sodium chlorate, zeolite crystals impregnated with calcium chloride (or another deliquescent or water absorbing and retaining substance), and zeolite crystals impregnated with an oxidizer. The oxidizer is a substance (or mixture of substances) which reacts (in the presence of water absorbed by the deliquescent or water absorbing substance) to release another substance which in turn reacts with one or more of the other impregnating substances to produce chlorine dioxide. In some of these embodiments, the oxidizer is ferric chloride or ferric sulfate, or a mixture of ferric chloride and ferric sulfate. Although each of these iron salts desirably absorbs water in addition to functioning as an oxidizer, ferric chloride is preferably used (rather than ferric sulfate, or a mixture of ferric chloride and ferric sulfate) since it is the most reactive during performance of the inventive method. Where sodium chlorate, ferric chloride, and sulfuric acid are present upon activation, the chlorine dioxide-producing reaction is believed to be: $2Na(ClO_3)+FeCl_3+H_2SO_4+3H_2O \rightarrow Na_2SO_4+Fe(OH)_3+3HCl+2H_2O+2ClO_2\uparrow$. In any of the second class of embodiments, the activation can be accomplished by exposing the mixture to a moisture-containing gas (e.g., air including water vapor), or (to achieve a higher chlorine dioxide production rate) causing water or a moisture-containing gas to flow through the mixture (or by causing the mixture to move through the gas). When activation is accomplished using a flowing fluid, all the impregnated zeolite crystals can be physically mixed together in a single bed, or the gas can be caused to flow sequentially through distinct beds of subsets of the zeolite crystals.

In some embodiments in the second class, chlorine dioxide is produced by activating a zeolite crystal mixture comprising zeolite crystals impregnated with sulfuric acid, zeolite crystals impregnated with sodium chlorate, zeolite crystals impregnated with at least one of hydrogen peroxide ($H_2O_2$), ferric chloride, and peracetic acid, and zeolite crystals impregnated with calcium chloride. Preferably, the mixture comprises equal (or substantially equal) amounts of crystals impregnated with each of the four chemicals. The activation is accomplished by exposing the mixture to a moisture-containing gas (e.g., air including water vapor), or (to increase the chlorine dioxide production rate) causing water or a moisture-containing gas (e.g., air including water vapor) to flow through the mixture. When activation is accomplished using flowing fluid, all impregnated zeolite crystals can be physically mixed together in a single bed, or the fluid can be caused to flow sequentially through distinct beds of subsets of the zeolite crystals. In embodiments in which the impregnated crystal mixture comprises distinct beds of different subsets of zeolite crystals (e.g., a bed of crystals impregnated with a first substance, and another bed of crystals impregnated with a second substance mixed with crystals impregnated with a third substance), the fluid must flow sequentially through the beds to accomplish activation.

Where sodium chlorate, hydrogen peroxide, and sulfuric acid are present upon activation, the chlorine dioxide-producing reaction is believed to be $2Na(ClO_3)+H_2O_2+H_2SO_4 \rightarrow 2ClO_2\uparrow+Na_2SO_4+H_2O$.

In variations on the embodiments described in the previous paragraph, zeolite crystals impregnated with sodium metabisulfite (or sodium bisulfite) are used rather than zeolite crystals impregnated with at least one of hydrogen peroxide, ferric chloride, and peracetic acid. Activation of the mixture by absorbed water (water absorbed by the deliquescent or water absorbing and retaining substance) causes a reaction of the sodium metabisulfite (or sodium bisulfite) which releases sulfur dioxide ($SO_2$). The $SO_2$ then reacts to form chlorine dioxide gas. Each of sodium metabisulfite and sodium bisulfite is considered an "oxidizer" in the sense that the latter expression is used herein, since each reacts (in the presence of the absorbed water) to release sulfur dioxide which in turn reacts with one or more of the other impregnating substances to produce chlorine dioxide.

In other embodiments in the second class, chlorine dioxide is produced by activating a zeolite crystal mixture comprising zeolite crystals impregnated with sodium chlorate, zeolite crystals impregnated with sulfuric acid, zeolite crystals impregnated with a deliquescent (or water absorbing and retaining substance) other than calcium chloride or any of the above-mentioned iron salts, and zeolite crystals impregnated with an oxidizer other than any of the above-mentioned iron salts. As in other embodiments in the second class, activation of the zeolite crystal mixture can be accomplished by exposing the mixture to a moisture-containing gas (e.g., air including water vapor), or (in order to increase the chlorine dioxide production rate) by causing water or a moisture-containing gas to flow through the mixture (or causing the mixture to move through such fluid). When activation is accomplished using flowing fluid, the impregnated zeolite crystals can be physically mixed together in a single bed or the fluid can be caused to flow sequentially through distinct beds of subsets of the zeolite crystals. The deliquescent (or water absorbing and retaining substance) can be magnesium sulfate ($MgSO_4$), potassium chloride, or magnesium chloride (MgCl).

In other embodiments, the invention is a method for producing chlorine dioxide by activating an impregnated zeolite crystal mixture with ferric chloride solution (preferably) or liquid hydrogen peroxide or liquid peracetic acid. The zeolite crystal mixture comprises zeolite crystals impregnated with sodium chlorate, zeolite crystals impregnated with sulfuric acid, and zeolite crystals impregnated with calcium chloride (or another deliquescent or water absorbing and retaining substance).

In other embodiments, the invention is a method for producing chlorine dioxide by activating an impregnated zeolite crystal mixture with liquid sulfuric acid. The zeolite mixture comprises zeolite crystals impregnated with sodium chlorate, zeolite crystals impregnated with at least one of hydrogen peroxide, ferric chloride, and peracetic acid, and zeolite crystals impregnated with calcium chloride (or another deliquescent or water absorbing and retaining substance).

In other embodiments, the invention is a method for producing chlorine dioxide by activating an impregnated zeolite crystal mixture with sodium chlorate solution. The zeolite mixture comprises zeolite crystals impregnated with sulfuric acid, zeolite crystals impregnated with at least one of hydrogen peroxide, ferric chloride, and peracetic acid, and zeolite crystals impregnated with calcium chloride (or another deliquescent or water absorbing and retaining substance).

Also within the scope of the invention are methods in which mixtures of two or more of the above-described impregnated zeolite mixtures are activated to produce chlorine dioxide. An example is a method for producing chlorine dioxide by activating a zeolite crystal mixture comprising zeolite crystals impregnated with sulfuric acid, zeolite crystals impregnated with sodium chlorate, zeolite crystals impregnated with at least one of hydrogen peroxide, ferric chloride, and peracetic acid, zeolite crystals impregnated with calcium chloride, and zeolite crystals impregnated with sodium metabisulfite (or sodium bisulfite).

Figure 3:
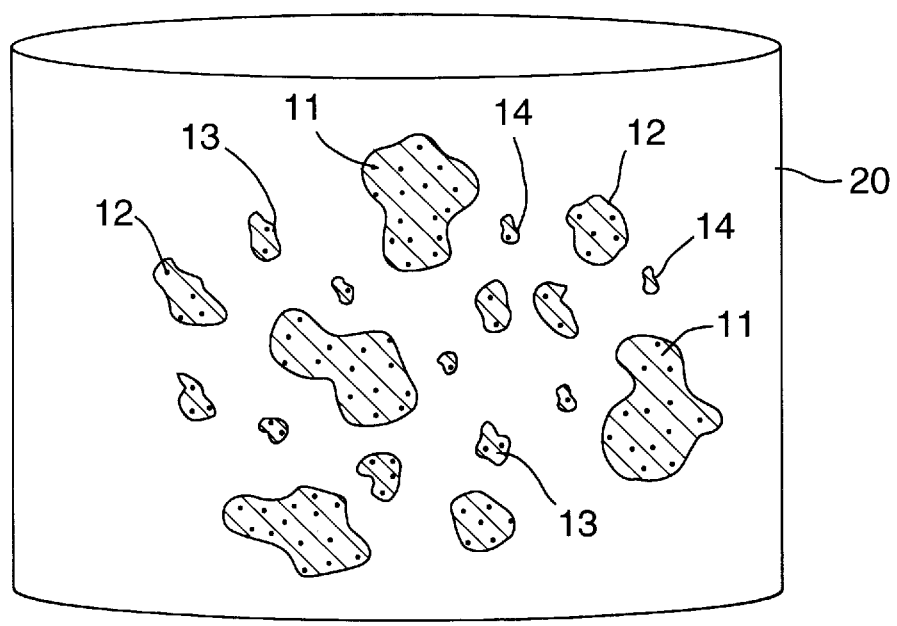
FIG. 3 is a cross-sectional view of a mixture of zeolite crystals, including zeolite crystals of one size impregnated with sodium chlorate, zeolite crystals of another size impregnated with sulfuric acid, zeolite crystals of a third size impregnated with a deliquescent (or water absorbing and retaining substance), and zeolite crystals of a fourth size impregnated with an oxidizer.

In any embodiment of the invention, the rate of chlorine dioxide release (upon activation of the zeolite crystal mixture) can be controlled in any of several ways, including by appropriately selecting the concentration and amount of the activating liquid (e.g., where the activating liquid is sodium chlorate solution or liquid sulfuric acid), using impregnated zeolite crystals having an appropriately selected weight ratio of one or more of the impregnating substances (e.g., iron salt) to zeolite, and selecting an appropriate method for activating the mixture. For example, activation by exposing the mixture to moisture-containing gas typically results in a low chlorine dioxide release rate, and activation by flowing water or moisture-containing gas through the mixture typically results in a higher chlorine dioxide release rate. Prior to activation, the mixture of impregnated crystals should be as dry as possible (preferably, the mixture is sealed within a dry, air-tight capsule or other container such as container 20 shown in FIG. 3, and the container is unsealed to expose the mixture to the activating fluid shortly before activation).

In another class of embodiments, the inventive method includes the step of regenerating a impregnated zeolite crystal mixture which has become spent during performance of any embodiment of the inventive chlorine dioxide production method.

The regeneration operation assumes that the zeolite crystal mixture was initially produced with the crystals impregnated with each chemical having a distinctive size or range of sizes. For example, the mixture can be that shown in FIG. 3, which comprises zeolite crystals 14 (having size in a first range) impregnated with sulfuric acid, zeolite crystals 13 (having size in a second range, each crystal in the second range being larger than the largest crystal in the first range) impregnated with sodium chlorate, zeolite crystals 12 (having size in a third range, each crystal in the second range being larger than the largest crystal in the second range) impregnated with hydrogen peroxide (or alternatively, another oxidizer), and zeolite crystals 11 (having size in a fourth range, each crystal in the fourth range being larger than the largest crystal in the third range) impregnated with calcium chloride (or alternatively, another deliquescent or water absorbing and retaining substance). The relative amounts of crystals in the subsets 11, 12, 13, and 14 are appropriate for the mixture's intended use. Regeneration of the mixture is preferably accomplished as follows: after chlorine dioxide production (with subsets 11, 12, 13, and 14 of the crystals mixed together in a single bed), the spent mixed crystals are sorted by size and cleaned if necessary; then, the spent crystals in each distinctive size range are reimpregnated with the appropriate chemical; and the reimpregnated crystals are then mixed together in the appropriate ratios to prepare a regenerated mixture.

In yet another class of embodiments, the invention is a mixture of impregnated zeolite crystals (e.g., that of FIG. 3) which can be activated (by any of the above-described liquids or by water or moisture-containing gas in accordance with the invention) to perform any embodiment of the inventive chlorine dioxide production method.

The chlorine dioxide produced in accordance with the invention can be used to kill microorganisms in the moisture-containing gas which activates the crystal mixture, and can oxidize volatile organic chemicals which contaminate the moisture-containing gas.

Various modifications and variations of the described methods and compositions of the invention will be apparent to those skilled in the art without departing from the scope and spirit of the invention. For example, a carrier other than zeolite crystals or water (e.g., pumice, diatomaceous earth, bentonite, or clay) can be used to carry one or more of the chemicals which impregnate zeolite crystals in the described methods.

Although the invention has been described in connection with specific preferred embodiments, it should be understood that the invention as claimed should not be unduly limited to such specific embodiments.

What is claimed is:

1. A method for producing chlorine dioxide, including the steps of:
    (a) providing a zeolite crystal mixture, the zeolite crystal mixture comprising zeolite crystals impregnated with sodium chlorite and zeolite crystals impregnated with at least one of ferric chloride and ferric sulfate; and
    (b) causing the zeolite crystal mixture to contact a moisture-containing fluid, thereby activating the zeolite crystal mixture to produce the chlorine dioxide.

2. The method of claim 1, wherein the zeolite crystal mixture also comprises zeolite crystals impregnated with calcium chloride.

3. The method of claim 1, wherein the zeolite crystal mixture comprises zeolite crystals impregnated with 2%–15% by weight of ferric chloride.

4. The method of claim 3, wherein the zeolite crystal mixture also comprises zeolite crystals impregnated with calcium chloride.

5. The method of claim 1, wherein the zeolite crystal mixture comprises zeolite crystals impregnated with 2%–10% by weight of sodium chlorite and zeolite crystals impregnated with 2%–15% by weight of at least one of ferric chloride and ferric sulfate.

6. The method of claim 1, wherein the zeolite crystal mixture is stored in a dry, air-tight container prior to step (b), and wherein step (b) includes the step of opening said container to expose the zeolite crystal mixture to the moisture-containing fluid.

7. The method of claim 1, wherein step (b) includes the step of causing the moisture-containing fluid to flow through the zeolite crystal mixture, so that the mixture is activated by water absorbed from the moisture-containing fluid and as a result said mixture produces the chlorine dioxide.

8. The method of claim 1, wherein the moisture-containing fluid is air including water vapor.

9. The method of claim 1, wherein the moisture-containing fluid consists essentially of liquid water.

10. A method for producing chlorine dioxide, including the steps of:
    (a) providing a zeolite crystal mixture, the zeolite crystal mixture comprising zeolite crystals impregnated with sodium chlorate, zeolite crystals impregnated with sulfuric acid, zeolite crystals impregnated with at least one of a deliquescent and a water absorbing and retaining substance, and zeolite crystals impregnated with an oxidizer; and
    (b) causing the zeolite crystal to contact a moisture-containing fluid, thereby activates the zeolite crystal mixture to produce the chlorine dioxide.

11. The method of claim 10, wherein the zeolite crystal mixture is stored in a dry, air-tight container prior to step (b), and wherein step (b) includes the step of opening said container to expose the zeolite crystal mixture to the moisture-containing fluid.

12. The method of claim 10, wherein the zeolite crystals impregnated with at least one of the deliquescent and the water absorbing and retaining substance are zeolite crystals impregnated with magnesium sulfate.

13. The method of claim 10, wherein the zeolite crystals impregnated with at least one of the deliquescent and the water absorbing and retaining substance are zeolite crystals impregnated with magnesium chloride.

14. The method of claim 10, wherein the zeolite crystals impregnated with at least one of the deliquescent and the water absorbing and retaining substance are zeolite crystals impregnated with calcium chloride.

15. The method of claim 14, wherein the zeolite crystals impregnated with said oxidizer are zeolite crystals impregnated with at least one of ferric chloride and ferric sulfate.

16. The method of claim 14, wherein the zeolite crystals impregnated with said oxidizer are zeolite crystals impregnated with 2%–15% by weight of at least one of ferric chloride and ferric sulfate.

17. The method of claim 14, wherein the zeolite crystals impregnated with said oxidizer are zeolite crystals impregnated with ferric chloride.

18. The method of claim 17, wherein the zeolite crystals impregnated with said oxidizer are zeolite crystals impregnated with 2%–15% by weight of ferric chloride.

19. The method of claim 14, wherein the zeolite crystals impregnated with said oxidizer are zeolite crystals impregnated with at least one of hydrogen peroxide, ferric chloride, and peracetic acid.

20. The method of claim 14, wherein the zeolite crystals impregnated with said oxidizer are zeolite crystals impregnated with at least one of sodium metabisulfite and sodium bisulfite.

21. The method of claim 10, wherein step (b) includes the step of causing the moisture-containing fluid to flow through the zeolite crystal mixture, so that the mixture is activated by water absorbed from the moisture-containing fluid and as a result said mixture produces the chlorine dioxide.

22. The method of claim 21, wherein the moisture-containing fluid is air including water vapor.

23. The method of claim 21, wherein the moisture-containing fluid consists essentially of liquid water.

24. A method for producing chlorine dioxide, including the steps of:
(a) providing a zeolite crystal mixture, the zeolite crystal mixture comprising zeolite crystals impregnated with sodium chlorate, zeolite crystals impregnated with calcium chloride, and zeolite crystals impregnated with at least one of hydrogen peroxide, ferric chloride, and peracetic acid; and
(b) causing the zeolite crystal mixture to come in contact with liquid sulfuric acid, thereby activating said zeolite crystal mixture to produce the chlorine dioxide.

25. The method of claim 24, wherein the zeolite crystal mixture comprises zeolite crystals impregnated with 2%–10% by weight of sodium chlorate, zeolite crystals impregnated with 2%–10% by weight of calcium chloride, and zeolite crystals impregnated with 2%–15% by weight of ferric chloride.

26. A method for producing chlorine dioxide, including the steps of:
(a) providing a zeolite crystal mixture, the zeolite crystal mixture comprising zeolite crystals impregnated with sulfuric acid, zeolite crystals impregnated with calcium chloride, and zeolite crystals impregnated with at least one of hydrogen peroxide, ferric chloride, and peracetic acid; and
(b) causing the zeolite crystal mixture to come in contact with sodium chlorate solution, thereby activating said zeolite crystal mixture to produce the chlorine dioxide.

27. The method of claim 26, wherein the zeolite crystal mixture comprises zeolite crystals impregnated with 2%–10% by weight of sulfuric acid, zeolite crystals impregnated with 2%–10% by weight of calcium chloride, and zeolite crystals impregnated with 2%–15% by weight of ferric chloride.

28. A method for producing chlorine dioxide, including the steps of:
(a) providing a zeolite crystal mixture, the zeolite crystal mixture comprising zeolite crystals impregnated with sodium chlorate, zeolite crystals impregnated with calcium chloride, and zeolite crystals impregnated with sulfuric acid; and
(b) causing the zeolite crystal mixture to come in contact with ferric chloride solution, thereby activating said zeolite crystal mixture to produce the chlorine dioxide.

29. A zeolite crystal mixture which is activatable by exposure to a fluid to produce chlorine dioxide, said mixture comprising:
zeolite crystals impregnated with sodium chlorite; and
zeolite crystals impregnated with at least one of ferric chloride and ferric sulfate.

30. The zeolite crystal mixture of claim 29, wherein the mixture comprises:
zeolite crystals impregnated with 2%–10% by weight of sodium chlorite: and
zeolite crystals impregnated with 2%–15% by weight of at least one of ferric chloride and ferric sulfate.

31. The zeolite crystal mixture of claim 29, wherein said mixture also comprises:
zeolite crystals impregnated with calcium chloride.

32. The zeolite crystal mixture of claim 29, wherein
the zeolite crystals impregnated with sodium chlorite have size in a first range, and
the zeolite crystals impregnated with at least one of ferric chloride and ferric sulfate have size in a second range distinct from the first range.

33. A zeolite crystal mixture which is activatable by exposure to a fluid to produce chlorine dioxide, said mixture comprising:
zeolite crystals impregnated with sodium chlorate;
zeolite crystals impregnated with sulfuric acid;
zeolite crystals impregnated with at least one of a deliquescent and a water absorbing and retaining substance; and
zeolite crystals impregnated with an oxidizer.

34. The zeolite crystal mixture of claim 33, wherein the zeolite crystals impregnated with at least one of the deliquescent and the water absorbing and retaining substance are zeolite crystals impregnated with magnesium sulfate.

35. The zeolite crystal mixture of claim 33, wherein the zeolite crystals impregnated with at least one of the deliquescent and the water absorbing and retaining substance are zeolite crystals impregnated with magnesium chloride.

36. The zeolite crystal mixture of claim 33, wherein the zeolite crystals impregnated with at least one of the deliquescent and the water absorbing and retaining substance are zeolite crystals impregnated with calcium chloride.

37. The zeolite crystal mixture of claim 36, wherein the zeolite crystals impregnated with said oxidizer are zeolite crystals impregnated with at least one of ferric chloride and ferric sulfate.

38. The zeolite crystal mixture of claim 36, wherein the zeolite crystals impregnated with said oxidizer are zeolite crystals impregnated with 2%–15% by weight of at least one of ferric chloride and ferric sulfate.

39. The zeolite crystal mixture of claim 36, wherein the zeolite crystals impregnated with said oxidizer are zeolite crystals impregnated with at least one of hydrogen peroxide, ferric chloride, and peracetic acid.

40. The zeolite crystal mixture of claim 36, wherein the zeolite crystals impregnated with said oxidizer are zeolite crystals impregnated with at least one of sodium metabisulfite and sodium bisulfite.

41. The zeolite crystal mixture of claim 33, wherein the zeolite crystals impregnated with sodium chlorate have size in a first range, the zeolite crystals impregnated with sulfuric acid have size in a second range distinct from the first range, the zeolite crystals impregnated with said at least one of the deliquescent and the water absorbing and retaining substance have a size in a third range distinct from each of the first range and the second range, and the zeolite crystals impregnated with the oxidizer have a size in a fourth range distinct from each of the first range, the second range, and the third range.

42. A zeolite crystal mixture capable of being activated by liquid sulfuric acid to produce chlorine dioxide, said mixture comprising:

zeolite crystals impregnated with sodium chlorate;

zeolite crystals impregnated with calcium chloride; and zeolite crystals impregnated with at least one of hydrogen peroxide, ferric chloride, and peracetic acid.

43. The mixture of claim 42, wherein said mixture comprises zeolite crystals impregnated with 2%–10% by weight of sodium chlorate, zeolite crystals impregnated with 2%–10% by weight of calcium chloride, and zeolite crystals impregnated with 2%–15% by weight of ferric chloride.

44. A zeolite crystal mixture capable of being activated by at least one of ferric chloride solution and liquid hydrogen peroxide to produce chlorine dioxide, said mixture comprising:

zeolite crystals impregnated with sodium chlorate;

zeolite crystals impregnated with calcium chloride; and zeolite crystals impregnated with sulfuric acid.

45. The mixture of claim 44, wherein said mixture comprises zeolite crystals impregnated with 2%–10% by weight of sodium chlorate, zeolite crystals impregnated with 2%–10% by weight of calcium chloride, and zeolite crystals impregnated with 2%–10% by weight of sulfuric acid.

46. A zeolite crystal mixture capable of being activated by sodium chlorate solution to produce chlorine dioxide, said mixture comprising:

zeolite crystals impregnated with at least one of hydrogen peroxide, ferric chloride, and peracetic acid;

zeolite crystals impregnated with calcium chloride; and zeolite crystals impregnated with sulfuric acid.

47. A method for producing chlorine dioxide using a zeolite crystal mixture and regenerating the zeolite crystal mixture after chlorine dioxide production, said method including the steps of:

(a) providing a zeolite crystal mixture, the zeolite crystal mixture comprising at least a first set of zeolite crystals and a second set of zeolite crystals, where the zeolite crystals in the first set have a size in a first range and are impregnated with a first substance, the zeolite crystals in the second set have a size in a second range and are impregnated with a second substance, and the second range is distinct from the first range;

(b) causing the zeolite crystal mixture to come in contact with a fluid, thereby activating the zeolite crystal mixture to produce the chlorine dioxide; and (c) after step (b), sorting the crystals of the zeolite crystal mixture by size range, then reimpregnating the zeolite crystals having a size in the first range with the first substance and reimpregnating the zeolite crystals having a size in the second range with the second substance, and then mixing the crystals together to produce a regenerated zeolite crystal mixture.

48. The method of claim 47, wherein the fluid is air including water vapor, and step (b) includes the step of causing the air including water vapor to flow through the zeolite crystal mixture, thereby activating the mixture by water absorbed from said air including water vapor.

49. The method of claim 47, wherein the zeolite crystal mixture is stored in a dry, air-tight container prior to step (b), and wherein step (b) includes the step of opening said container to expose the zeolite crystal mixture to the fluid.

50. The method of claim 47, wherein the zeolite crystals in the first set are impregnated with sodium chlorite, and the zeolite crystals in the second set are impregnated with at least one of ferric chloride and ferric sulfate.

51. The method of claim 47, wherein:

the zeolite crystal mixture produced in step (a) also comprises a third set of zeolite crystals, where the zeolite crystals in the third set have a size in a third range and are impregnated with a third substance, and the third range is distinct from each of the first range and the second range; and step (c) includes the operation of reimpregnating the zeolite crystals having size in the third range with the third substance.

52. The method of claim 51, wherein the zeolite crystals in the first set are impregnated with sodium chlorite, the zeolite crystals in the second set are impregnated with at least one of ferric chloride and ferric sulfate, and the zeolite crystals in the third set are impregnated with calcium chloride.

53. The method of claim 51, wherein the fluid is liquid sulfuric acid, the first substance is sodium chlorate, the second substance is at least one of hydrogen peroxide, peracetic acid, and ferric chloride, and the third substance is calcium chloride.

54. The method of claim 51, wherein the fluid is liquid hydrogen peroxide, the first substance is sodium chlorate, the second substance is sulfuric acid, and the third substance is calcium chloride.

55. The method of claim 51, wherein the fluid is ferric chloride solution, the first substance is sodium chlorate, the second substance is sulfuric acid, and the third substance is calcium chloride.

56. The method of claim 51, wherein the fluid is sodium chlorate solution, the first substance is at least one of hydrogen peroxide, ferric chloride, and peracetic acid, the second substance is sulfuric acid, and the third substance is calcium chloride.

57. The method of claim 47, wherein:

the zeolite crystal mixture produced in step (a) also comprises a third set of zeolite crystals and a fourth set of zeolite crystals, where the zeolite crystals in the third set have a size in a third range and are impregnated with a third substance, the zeolite crystals in the fourth set have a size in a fourth range and are impregnated with a fourth substance, the third range is distinct from each of the first range and the second range, and the fourth range is distinct from each of the first range, the second range, and the third range; and step (c) includes the operations of reimpregnating the zeolite crystals having a size in the third range with the third substance and reimpregnating the zeolite crystals having a size in the fourth range with the fourth substance.

58. The method of claim 57, wherein:

the first substance is sodium chlorate, the second substance is sulfuric acid, the third substance is at least one of a deliquescent and a water absorbing and retaining substance, and the fourth substance is an oxidizer.

59. The method of claim 57, wherein:

the first substance is sodium chlorate, the second substance is sulfuric acid, the third substance is calcium chloride, and the fourth substance is an oxidizer.

60. The method of claim 57, wherein:

the first substance is sodium chlorate, the second substance is sulfuric acid, the third substance is calcium chloride, and the fourth substance is at least one of ferric chloride and ferric sulfate.

61. The method of claim 57, wherein:

the first substance is sodium chlorate, the second substance is sulfuric acid, the third substance is calcium chloride, and the fourth substance is hydrogen peroxide.

62. The method of claim 57, wherein:

the first substance is sodium chlorate, the second substance is sulfuric acid, the third substance is calcium chloride, and the fourth substance is ferric chloride.

63. The method of claim 57, wherein:

the first substance is sodium chlorate, the second substance is sulfuric acid, the third substance is calcium chloride, and the fourth substance is at least one of sodium metabisulfite and sodium bisulfite.

* * * * *